United States Patent [19]

Hirose et al.

[11] 3,924,139

[45] Dec. 2, 1975

[54] APPARATUS FOR PHOTO-OXIDATION OF WATER

[75] Inventors: Michio Hirose; Mitsunobu Otani; Kiyoshi Yamada; Naoyuki Mitani, all of Otsu; Kiyotugu Tanaka, Shiga, all of Japan

[73] Assignee: Toray Industries, Inc., Tokyo, Japan

[22] Filed: Aug. 12, 1974

[21] Appl. No.: 496,584

Related U.S. Application Data

[63] Continuation-in-part of Ser. No. 321,974, Jan. 8, 1973, abandoned.

[30] Foreign Application Priority Data

| Jan. 7, 1972 | Japan | 47-4329 |
| Feb. 5, 1972 | Japan | 47-12953 |
| Apr. 1, 1972 | Japan | 47-32982 |
| May 26, 1972 | Japan | 47-51679 |
| May 30, 1972 | Japan | 47-52938 |

[52] U.S. Cl. ............. 250/527; 21/DIG. 2; 210/199; 210/320
[51] Int. Cl.² .......................... A61L 3/00; B01K 1/00
[58] Field of Search ......... 21/DIG. 2; 210/199, 320; 250/527; 204/157.1 R

[56] References Cited
UNITED STATES PATENTS

| 1,193,143 | 8/1916 | Henri et al. | 21/DIG. 2 |
| 2,485,267 | 10/1949 | Ellner | 250/434 |
| 3,079,498 | 2/1963 | Ruffin | 250/430 |
| 3,433,946 | 3/1969 | Hardwick | 250/343 |
| 3,649,493 | 3/1972 | Meiners et al. | 204/157.1 |

*Primary Examiner*—Howard S. Williams

[57] ABSTRACT

Improved photo-oxidation apparatus for purifying water, which has at least two reaction chambers each connected by water passageways with neighboring chambers, and which has in each chamber, sources of ultraviolet light dipped practically vertically into the water to be treated and fixed by holders placed above the surface of the water. The apparatus is also equipped with nozzles through which gas, usually containing oxygen, is supplied, and with inlets for oxidizing agents, catalysts or photosensitizers in at least two of these chambers or sections.

7 Claims, 15 Drawing Figures

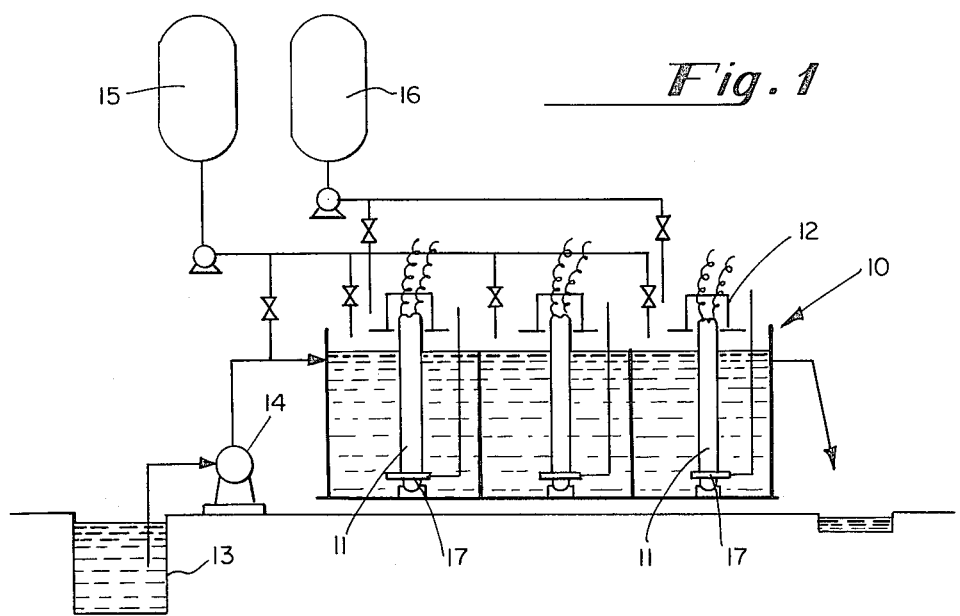
Fig. 1
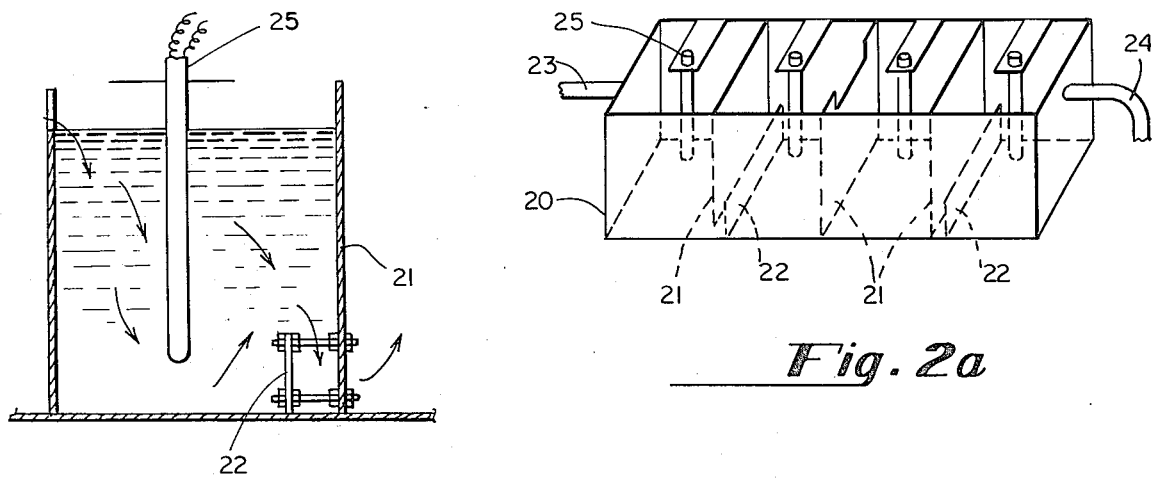
Fig. 2a
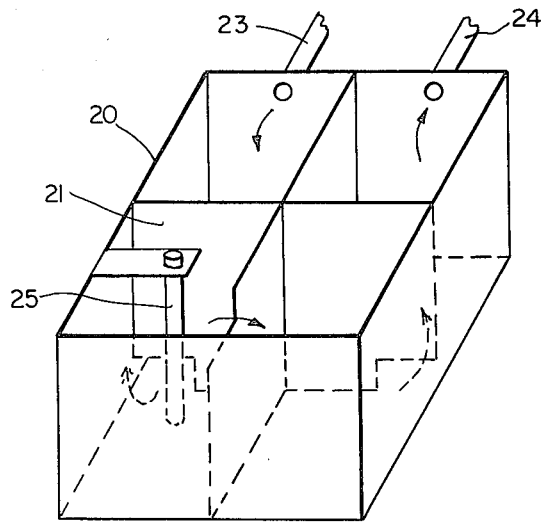
Fig. 2b
Fig. 2c

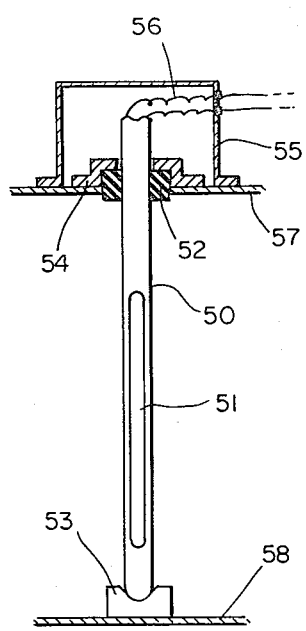
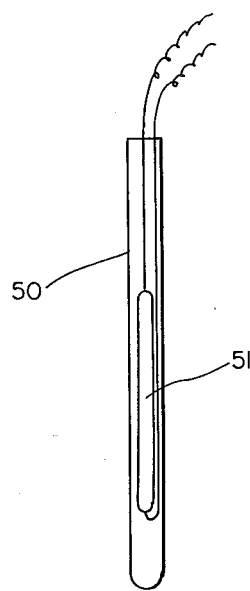
Fig. 5a
Fig. 5b
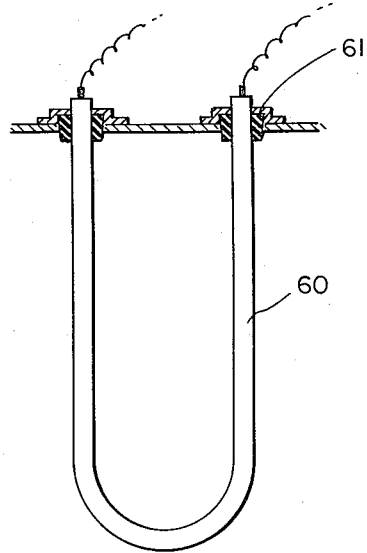
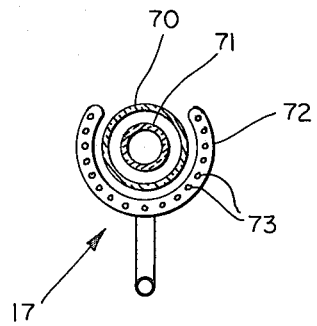
Fig. 6
Fig. 7

APPARATUS FOR PHOTO-OXIDATION OF WATER

This application is a continuation-in-part of our parent application Ser. No. 321,974, filed Jan. 8, 1973, now abandoned.

BACKGROUND OF THE INVENTION

This invention relates to an apparatus for photooxidation, especially to a new apparatus for purifying waste water by means of photo-oxidation.

Water pollutants consisting of discharged organic or inorganic substances generally consume dissolved oxygen in the water and decrease the quality of the water. To maintain water quality, chemical oxygen demand (COD) or biological oxygen demand (BOD), which are functions of oxygen demand indicative of the aforementioned pollutants, should be controlled within adequate limits.

The activated-sludge method, a biological treatment, has been widely used hitherto for treating various waste waters. But both the proportion of pollutants removed and the concentration of pollutants achieved by this method are limited, so that in some cases water treated by this method is not purified enough.

Typically, the activated-sludge method is representative of secondary treatment processes for waste water; however, tertiary treatment method is often required nowadays. Without suitable tertiary treatments, further environmental pollution may be unpreventable.

Methods used for tertiary treatment of waste water include adsorption with activated charcoal, oxidation with suitable oxidation reagents, and separation by selective membrane. These methods are well known, but few of them are put to practical use.

The present invention relates to an apparatus with which the pollutants in water are reduced through oxidation using both ultraviolet light and oxidizing agents.

Apparatus using both light and oxidizing agents has previously been suggested (e.g., U.S. Pat. No. 3,649,493).

In such apparatus, the reactions usually involve components in such diluted concentrations in the water that the apparatus must be highly effective in order to treat waste water continuously, otherwise the required mean residence time would be too long.

Furthermore, mixing of water must be minimized in such apparatus in order to achieve effective reduction of pollutants, but the uniformity between the upper and lower parts of the water is so great that the rate of reduction of pollutants is lowered. This is due in part to the fact that the reaction vessel must be deep enough to contain usually long light sources.

Mechanical stirrers which are equipped to attain sufficient mixing are undesirable, because they would both hinder light and raise the problem of protecting the lamp tubes from them.

In addition the lamp tubes should be protected from dirt and stains. No convenient apparatus to satisfy these problems has been suggested.

Considering these problems, we have succeeded in developing quite an efficient photo-oxidation apparatus for purifying water.

SUMMARY OF THE INVENTION

This invention relates to an improved photo-oxidation apparatus for purifying water which has at least two reaction chambers each connected with each neighboring chamber through a passageway, and which has in each reaction chamber an ultraviolet light source dipped practically vertically into the water to be treated and fixed by holders placed above the surface of the water. This apparatus is also equipped with gas suppliers, disposed near the bottom of said each ultraviolet light source in order to agitate waste water in that vicinity. Through these gas suppliers gas, usually containing oxygen, is supplied. Further, this apparatus is equipped with inlets for oxidizing agents, catalysts or photosensitizers in at least two of these chambers.

It is an object of the present invention to achieve efficient reaction by means of several reaction chambers, each separated from each neighboring chamber thereto except for a small water passageway between them, which passageway prevents any significant back flow or reverse mixing while permitting thorough mixing to occur in each chamber.

It is another object of the present invention to utilize useful emitted light efficiently and completely because of light sources which are placed vertically in the water to be treated.

It is a further object of the present invention to utilize the bubbling of gas, usually containing oxygen, supplied from an inlet placed under the aforementioned light sources, to prevent the formation of dirt deposits on the covers of the light sources and to assist in the oxidizing reaction.

A still further object of the present invention is to make it possible gradually to supply oxidizing agents, catalysts, or photosensitizers, through several inlets as the reaction proceeds, in order to minimize consumption of these agents.

BRIEF DESCRIPTION OF THE DRAWINGS

The apparatus of the invention is disclosed and explained in more detail below, particularly with reference to the accompanying drawings, in which:

FIG. 1 is a diagrammatic side view of one embodiment of the processing apparatus of the present invention;

FIG. 2a and FIG. 2c are perspective views of the reaction chambers in two forms of the apparatus of the present invention.

FIG. 2b is a sectional view showing the detail of the internal baffle of FIG. 2a;

FIG. 5a is a side view of an ultraviolet light source with its holding fixture so arranged to be immersed into a liquid reaction chamber from above the liquid level;

FIG. 5b is a side view of another form of ultraviolet light source useful in the present form of the invention;

FIG. 6 is a view similar to that of FIG. 5a, showing still another ultraviolet light source and its holding system, for use in the present invention;

FIG. 7 is a detailed view of a device used to supply gas near the bottom of the ultraviolet source in the present invention;

DESCRIPTION OF THE PREFERRED EMBODIMENT

Figure 2D:
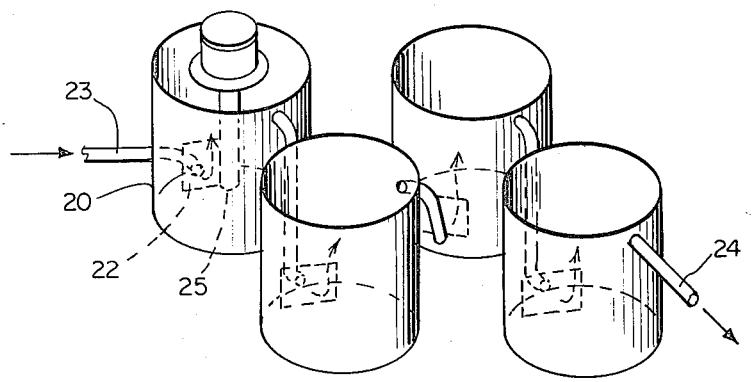
FIG. 2d is a perspective view of apparatus, in accordance with the present invention, in which the reacting zones are located separately in independent reaction chambers.

Referring to the drawings and more particularly to FIG. 1, there is shown an apparatus comprising a photoreactor 10 including a plurality of ultraviolet light sources 11 extending down into each chamber of apparatus 10 and held by means of suitable holder assemblies 12, set up at the upper part of the reactor. Light sources 11 are also disposed near an oxygen-containing gas supply device 17 in each chamber. Waste water in a pit 13 is pumped up by an appropriate pump 14 and supplied to the photoreactor. Chemicals, such as oxidizing agents, catalizer and/or others is also supplied to the reactor from plural inlets connected, respectively, for example, to storage tanks 15 and 16.

In order to explain in more detail the photoreactor of the present invention, reference to FIGS. 2a and 2c, which are illustrations of structures of the present invention, is helpful. As shown in those Figures, reactor vessel 20 is divided into plural reaction chambers by means of baffles 21 possessing suitable dimensional openings to form water passageways between chambers.

In the apparatus of this invention, it is preferred that the ratio of the volume (cubic meters) of each reaction chamber to flow rate (cubic meter/hour) of water in said chamber be within the range of 0.1 – 1 and that the ratio of said volume to the area (square meter) of the outlet of the chamber, for discharging water, be within the range of 10 – 100. This ensures adequate residence time for water treatment in each chamber and, on the other hand, promotes mixing in each reaction chamber. In the multi-chamber reaction apparatus shown in FIGS. 2a and 2c, waste water is supplied to the first reaction chamber through conduit 23 near the top thereof, leaves the first chamber through an opening, forming a passageway, near the bottom of baffle 21, the respective positions of inlet and outlet being reversed in each succeeding chamber such that the velocity vector of the waste water is inverted or vertically reversed in each chamber while the ultraviolet source 25 is maintained about the center of each reaction chamber. Finally, after passing through each of the chambers in vessel 20 waste water is discharged from conduit 24. During this process, oxidizable impurities in the water are decomposed and oxygen demand of the water is reduced.

The passageways between chambers of vessel 20 (more specifically the openings in baffles 21) may be regulated, for example, by a set of removable sub-baffles 22 as shown in FIGS. 2a and 2b, which permits adjustment of the aforementioned chamber volume to outlet area ratio.

It should be noted that it is not always necessary that the reactor vessel of this invention be a single unit divided by means of baffles, as shown in FIGS. 2a and 2c. Instead, independent chambers may be connected as shown in FIG. 2d to effect better mixing (less back-mixing) control.

Figure 3A:
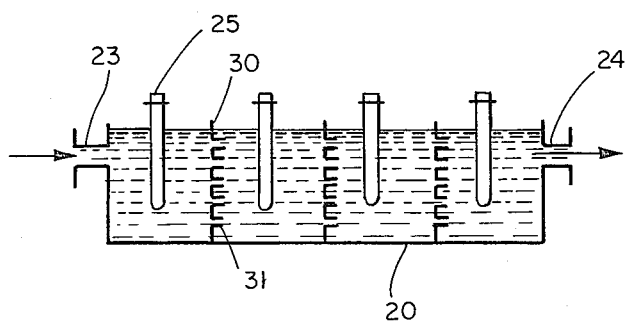
FIG. 3a and FIG. 4a are schematic sectional, side views of baffle arrangements in other useful embodiments of the present invention.
Figure 3B:
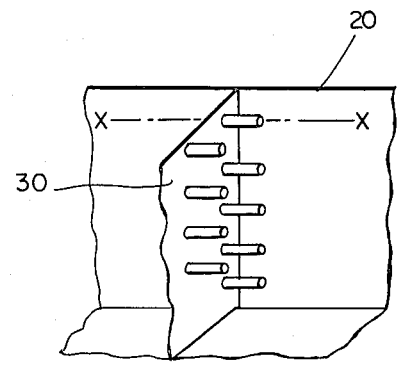
FIG. 3b and FIG. 4b are enlarged perspective views of the baffle arrangements of FIG. 3a and FIG. 4a, respectively.
Figure 4A:
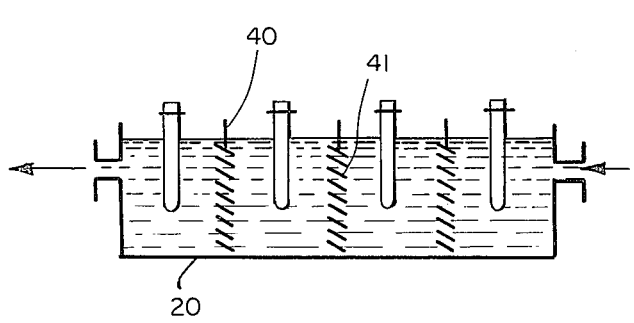
Figure 4B:
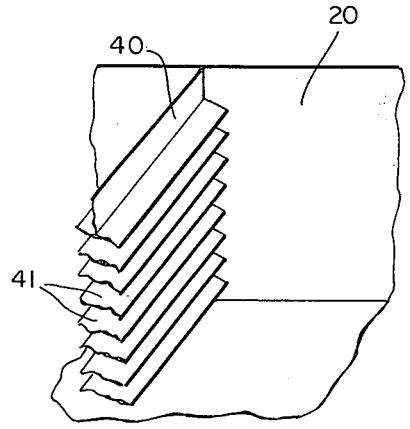

Other forms of baffles than those shown in FIGS. 2a and 2c may also be used. For example, modified baffles are shown in FIGS. 3a and 4a of which details are shown in FIGS. 3b and 4b. In FIGS. 3a and 3b, a partition wall 30 is used, on which suitable numbers of tubes or pipes 31 are arranged to provide water passageways between chambers. In FIGS. 4a and 4b, partition wall 40 includes several inclined plates 41, the spacing and angle of inclination of which define the inter-chamber passageway. (Other elements in FIGS. 3a, 3b, 4a, 4b are numbered as in FIGS. 2a – 2d with the same explanation applicable thereto). These baffles are preferable for the apparatus of the invention, and more effective than a simple screen or perforated plate with respect to controlling the flow pattern and preventing back-flow in the photoreactor as stated above.

Effective light for photooxidation in the apparatus of the present invention is in the region of the ultraviolet part of the light spectrum. Accordingly, various ultraviolet sources can be utilized. However, mercury vapor lamps are most useful and preferred because of their great power and long life.

As one example of the light source and its mounting means as used in the present invention, there is shown in FIG. 5a a high pressure mercury lamp which arc tube 51 is separated from the atmosphere or surrounding space by outer tube 50, supported at bracket 57, with an assembly such as rubber gasket 52 and attaching plate 54. The lamp is also fixed in place by a receiving mount 53 on the bottom 58 of the reactor, thus being centered and maintained perpendicularly in the photoreactor. Head cover 55, with openings for lead wires 56, is also secured on brackets 57.

Another useful light source, as shown in FIG. 5b, consists of arc tube 51 in an open quartz outer tube 50 which is not sealed up, and which therefore is convenient for exchanging the arc tube when it fails. In the assembly of this source, however, it is necessary to give careful consideration to preventing oxidation of the metallic part of the lamp.

Low pressure mercury lamps are also useful. In some cases they are more effective than the high pressure ones because high pressure lamps emit more energy than can be absorbed efficiently by the waste water. (Nevertheless, it is a fact that the greater the power required, the longer the arc tube becomes.) In FIG. 6, another embodiment of the light source used in the present invention is shown, this being a low pressure mercury, U-shaped lamp. More specifically, bent arc tube 60 is supported at two points by means of holding assemblies 61 similar to that of FIG. 5a. It is preferred in all cases that the radiant part of the ultraviolet light source be suspended in the reaction chamber below the surface of the waste water being treated.

Another important aspect of the present invention is concerned with the device which supplies agitating, and in some cases oxidizing, gas, referred to above as gas supply device 17, as shown in FIG. 1.

Figure 8:
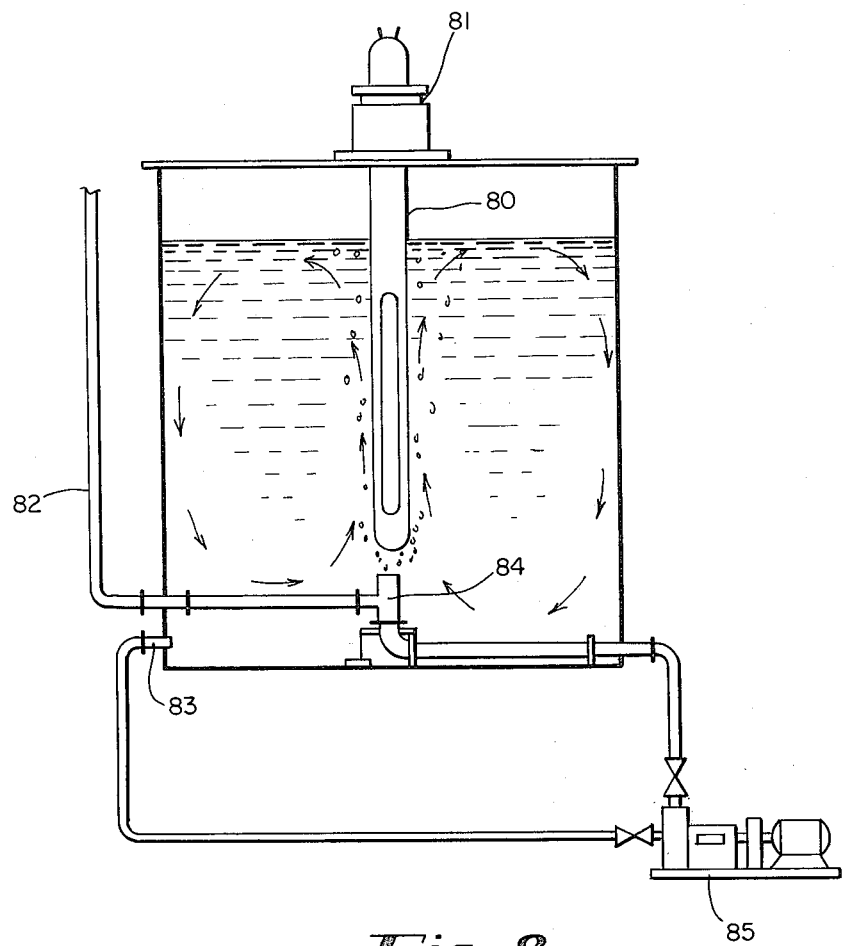
FIG. 8 is a schematic side view, in section, showing an arrangement used to supply air, and, according to circumstances, chemicals dissolved in water, simultaneously.

Further details of gas supply device 17 are shown in FIGS. 7 and 8.

In FIG. 7, gas supply device 17 is shown in top view with the outer tube 70 and arc tube 71 of the UV light source shown in section. Gas distribution tube 72 with a suitable number of holes 73, is arranged surrounding the lamp 70, 71 near the bottom periphery thereof. Preferably, the diameter of holes 73 is less than about 2 mm so that gas emitted therefrom generates fine bubbles which, if it is an oxidizing gas as is preferred, speedily transfer oxygen to the waste water being treated and which prevent scaling, deposits, and dirt build-up on the walls of lamp tube 70.

It is especially desirable that the gas supply device 17 (particularly gas distribution tube 72) be placed at a distance not further than 10 cm from the wall of the light source in order most effectively to prevent scaling, deposit, sticking, etc., thereon. In other embodiments of this invention metal tubes or porous plastic tubes may be utilized in place of distribution tube 72 with holes 73.

In FIG. 8, another embodiment of gas supply device useful in the present invention is shown.

More specifically, oxygen containing gas, for instance air, is supplied through pipe 82 by means of diffuser 84 located near light source 80 supported by holder 81. Air flow is produced by the Venturi effect of waste water circulated by pump 85 and continuously circulating conduit 83.

In the method and apparatus of the present invention, as illustrated in FIG. 8, chemicals such as oxidizing agents or other chemicals can also be simultaneously supplied by connecting supply pipes for such chemicals to the circulating conduit 83.

Another feature of the present invention is that oxidizing catalysts or other chemicals may be supplied in at least two separate sections of the photoreactor.

Figure 9:
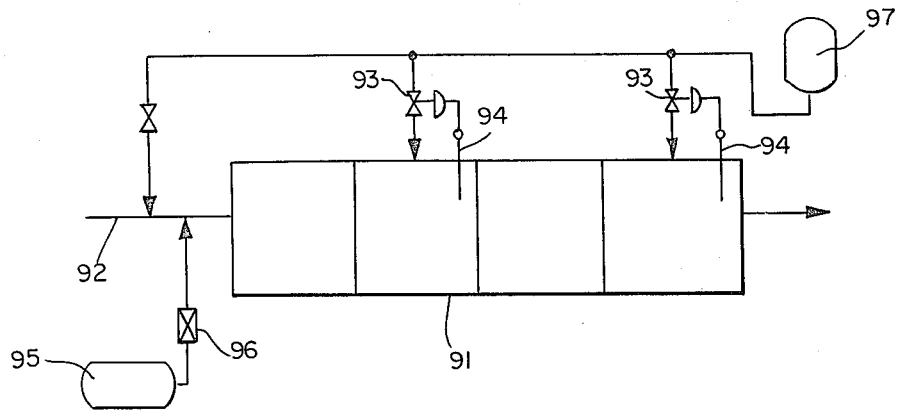
FIG. 9 is a diagrammatic view, showing a controlled feed system for chemicals and/or oxidizing agents in the present invention.

For example, as illustrated in FIG. 9, chlorine, used as an oxidizing agent and caustic used as pH controlling agent, are supplied from reservoirs thereof 95 and 97, respectively. Caustic is supplied first from reservoir 97 to incoming waste water line 93 to increase the solubility of chlorine therein. Next, chlorine is fed from reservoir 95 through supplier of chlorine 96 to incoming water line 92 from which the water to be treated is fed into photoreactor 91.

Because the pH of the water being treated tends to drop as chlorine is decomposed therein by the ultraviolet rays, additional caustic is supplied to the second and fourth chambers in photoreactor 91 through control valves 93 connected to pH detectors 94 and controllers (not shown) associated therewith in order to maintain the preferred reacting condition in photoreactor 91.

According to particular design requirements, caustic may be supplied in one or more of the chambers of the photoreactor 91.

In another example of a process using the apparatus of the present invention, there is a process in which hypochlorite or some other oxidizing agent is supplied to plural sections of the reactor because of its effective consumption of impurites, that is to say, it requires less oxidizing agent to be consumed to effect the desired decrease in COD of the waste water.

As further examples of the invention, particularly relating to the criticality of the concept of focusing the supply of gas upon the surface of the ultraviolet light source, the following tests were performed, and showed sharply improved results that were obtained by focusing the supply of gas upon the surface of the ultraviolet light source, than would be obtained by providing the gas at a remote distance from the surface of the ultraviolet light source.

These tests were conducted for the purpose of determining the relationship between the pollutant reduction ratio and the operating time of the apparatus of the aforesaid invention, setting the gas supply device at several different positions. The results of the tests appear in the following table:

Table

| R (cm) | C.O.D. Reduction % | Operating Time (Days) |
|---|---|---|
| 10 | 92 | 0 |
| 10 | 94 | 4 |
| 10 | 92 | 8 |
| 10 | 90 | 12 |
| 10 | 88 | 15 |
| 10 | 92 | 17 |
| 10 | 94 | 22 |
| 10 | 90 | 28 |
| 15 | 92 | 0 |
| 15 | 83 | 4 |
| 15 | 82 | 8 |
| 15 | 70 | 10 |
| 15 | 69 | 14 |
| 15 | 60 | 20 |
| 20 | 92 | 0 |
| 20 | 52 | 3 |
| 20 | 19 | 7 |
| 20 | 10 | 10 |
| 20 | 9 | 14 |
| * | 92 | 0 |
| * | 70 | 1 |
| * | 43 | 2 |
| * | 19 | 3 |
| * | 10 | 5 |

(* = no aeration)

Accordingly, it will be apparent that the spacing of the gas source is very critical. It will be observed that the figures reported, representing 10 cm distance, show that the C.O.D. Reduction % remains almost completely unchanged even after 28 operating days of the apparatus. In sharp contrast, when this distance is equal to 20 cm, the reduction in C.O.D. rapidly approached zero, even after such a short period of operation as 7 days. Similar results were obtained, using no aeration at all.

It will be appreciated, accordingly, that there is criticality with respect to the positioning of the gas supply devices that are disposed in each of the chambers according to this apparatus, near the bottom of the ultraviolet light source therein, at a distance not further than 10 cm from the wall of the light source. Further, it is critical that the gas supply devices be arranged to flow against those surfaces of the ultraviolet light sources which are in contact with the water to be treated.

The following is claimed:
1. Apparatus for purifying waste water by photooxidation reaction which comprises:
   a. plural reaction chambers, each reaction chamber having at least one inlet and at least one outlet for water,
   b. at least one water passageway connecting the outlet of one reaction chamber with the inlet of a second reaction chamber in order to connect said chambers for sequential treatment of waste water wherein the inlet of the first reaction chamber in said sequence is adapted to be connected to a supply of waste water to be treated, and the outlet of the last chamber in said sequence is adapted to discharge purified water from the apparatus.
   c. ultraviolet light sources vertically suspended in said each reaction chamber from the top of said reaction chamber near the center thereof, and having outer surfaces adapted to be immersed in and in contact with the water to be treated,
   d. inlets for chemicals or/and oxidizing agent arranged in at least two of said reaction chambers, and e. gas supply devices disposed in each of said chambers near the bottom of said ultraviolet light source therein, at a distance not further than 10 cm. from the wall of the light source, and arranged to provide a gas flow against those surfaces of said ultraviolet light sources which are adapted to be in contact with the water to be treated, and further adapted to agitate waste water near said light source, so that waste water supplied from the inlet of the first reaction chamber is oxidized and purified in said chambers by ultraviolet light together with suitable oxidizing agent as said water flows from the first reaction chamber to the final reaction chamber through said sequentially arranged chambers and the passageways therebetween, and purified water is discharged from the outlet of the final reaction chamber.

2. Apparatus as recited in claim 1, wherein said inlet and said outlet for water in each reaction chamber are located on horizontally opposite sidewalls and one member selected from the group consisting of said inlet and outlet is located near the top of said sidewall while the other of said inlet or outlet is located near the bottom of said horizontally opposite sidewall, such that the water flow through each said chamber is substantially symmetrical with respect to said ultraviolet light source in said chamber, and the radiant part of said ultraviolet light source is adapted to be suspended below the level of the surface of water in said chamber when waste water is treated therein.

3. Apparatus, as recited in claim 1, wherein the ratio of volume (in cubic meters) of each reaction chamber to flow rate (in cubic meters/hour) of water in said chamber is within the range of 0.1 – 1 and the ratio of said volume to the area (in square meters) of the outlet of said chamber for discharging water therefrom is within the range of 10 – 100.

4. Apparatus for purifying waste water by a photooxidation reaction which comprises
   a. a vessel,
   b. at least one baffle plate vertically disposed in said vessel for dividing said vessel into at least two reaction chambers, said baffle having at least one water passageway therethrough in order to connect said reaction chambers in a row for sequentially treating water, the first reaction chamber in said sequence having an inlet for waste water and the final reaction chamber in said sequence having an outlet for purified water,
   c. ultraviolet light sources vertically suspended in said each reaction chamber from the top of said reaction chamber near the center thereof, and having outer surfaces adapted to be immersed in and in contact with the water to be treated,
   d. inlets for chemicals or/and oxidizing agent arranged in at least two of said reaction chambers, and
   e. gas supply devices disposed near the bottom of said ultraviolet light source in each of said chambers at a distance not further than 10 cm. from the wall of the light source and arranged to provide a gas flow against those surfaces of said ultraviolet light sources which are adapted to be in contact with the water to be treated, and further to agitate waste water about said light source so that the exposed surface of said light source is cleaned while waste water supplied from the inlet of the first reaction chamber is oxidized and purified in said chambers by ultraviolet light together with oxidizing agent as it flows from the first reaction chamber to the final reaction chamber through said chambers and passageways therebetween, and purified water is discharged from the outlet of the final reaction chamber.

5. Apparatus, as recited in claim 4, wherein said baffle plate is arranged transversely to the flow direction of said water.

6. Apparatus, as recited in claim 5, wherein said baffle plate consists of a wall having at least one water passageway therethrough, and wherein said wall consists of angularly inclined plural plates, whereby the space between said plates forms said water passageway.

7. Apparatus, as recited in claim 5, wherein said water passageway consists of a tube or pipe.

* * * * *